April 15, 1930.  C. A. BRAIDWOOD  1,755,047
FISH LURE
Filed Jan. 25, 1928
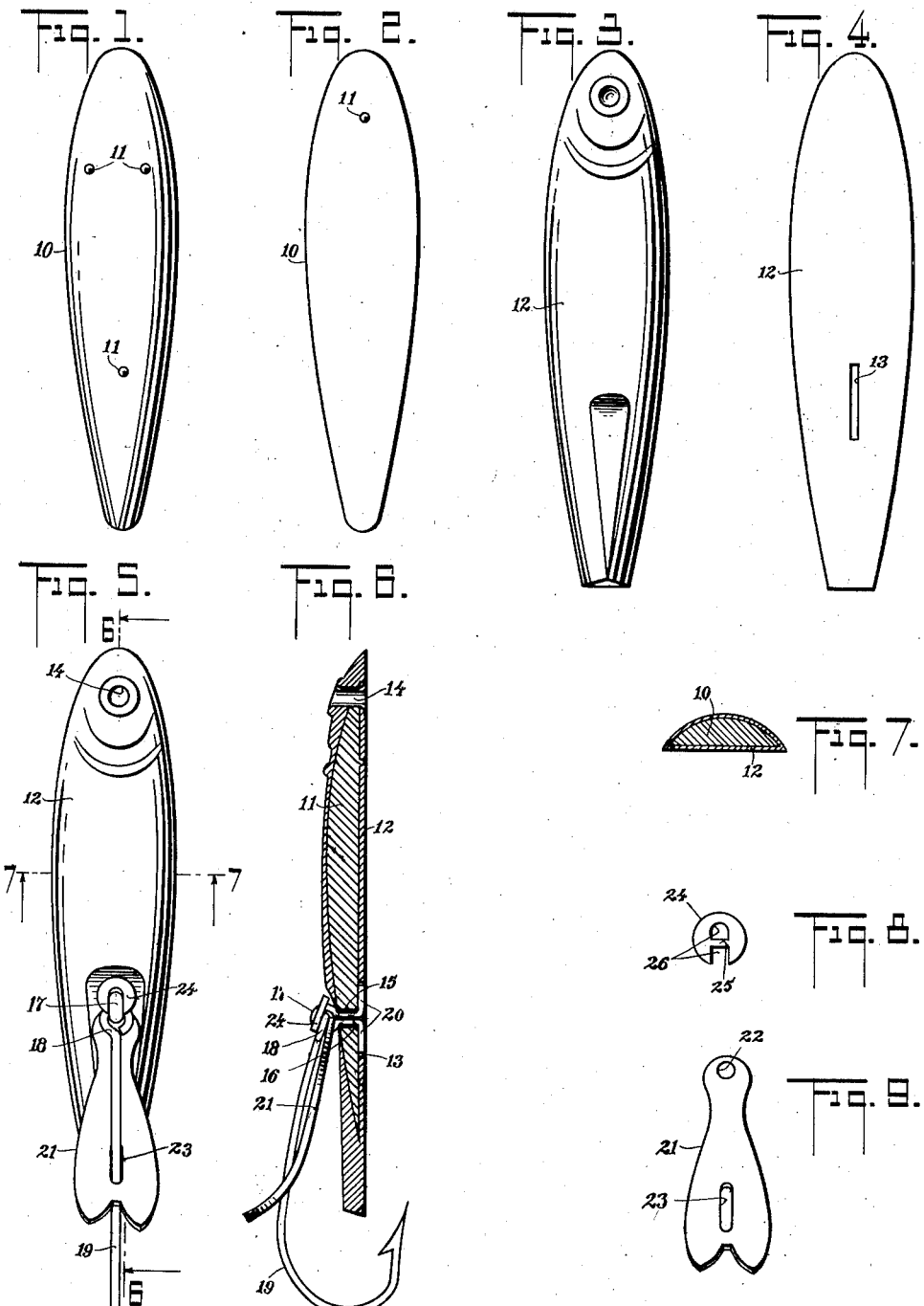
INVENTOR
Chester A. Braidwood
BY
ATTORNEY Patented Apr. 15, 1930

1,755,047

UNITED STATES PATENT OFFICE

CHESTER A. BRAIDWOOD, OF PERTH AMBOY, NEW JERSEY

FISH LURE

Application filed January 25, 1928. Serial No. 249,406.

This invention relates to a fish lure and hook connecting means therefor.

One of the objects of the invention is the production of a fish lure which will be so constructed and be made of such materials as to be always bright and shiny, which will have the proper balance and weight to be useful in conjunction with trolling rigs, also casting rigs, and which when used with casting rigs, will not be unduly impeded by the resistance of wind.

Another object of the invention is the combination with a fishing lure of an improved means for associating a hook with the lure whereby to utilize the drag of the water when trolling to hold the hook up in the correct striking position, and to limit the downward motion of the hook, and to prevent the hook from locking or cocking.

The nature of the invention and its distinguishing features and advantages will appear when the following specification is read in connection with the accompanying drawing, in which—

Figure 1, is an elevation of one side of the core of the lure.

Fig. 2 is a view similar to Fig. 1, of the opposite side.

Fig. 3, is an elevation of one side of the complete lure.

Fig. 4, is a view similar to Fig. 3, of the opposite side.

Fig. 5, is an elevation of the lure and hook with the improved means for connecting the hook with the lure.

Fig. 6, is a sectional view taken on the line 6—6 of Fig. 5.

Fig. 7, is a transverse section taken on the line 7—7, Fig. 5.

Fig. 8, is an elevation of one of the hook retaining members.

Fig. 9, is an elevation of another hook retaining member.

In accordance with the present invention use is made of a core or body 10 of suitable shape, weight and size, and is preferably made of lead. The said core 10 is molded or cast by the use of a suitable mold, which provides the core with teats 11, there being three teats on one side, and one on the opposite side near one end. The core or body 10 is covered or inclosed by suitable material, tin in the present instance, which will not discolor from use, and which will always be bright and shiny to give the desired attraction or luring effect, because of its inherent properties. This external covering of tin is designated 12. To apply the tin, use is made of a suitable mold which accommodates the core 10, the teats 11 serving to hold the core properly set in the mold so that when the tin in molten form is poured into the mold it will completely cover or inclose the core or body 10. The mold used to apply the covering has a suitable projection which serves with the teats 11 to properly set the core or body 10, and produces an elongated recess 13 at the tail end of the lure. The lure so constructed will have the proper balance and weight, and will be useful in conjunction with trolling lines, also casting lines, and when used with casting lines will not be unduly impeded by the resistance of the air or wind. A hole 14 is drilled in the head end of the lure for accommodating one end of the line. A hole 15 is drilled through the lure coincidentally with the recess 13. The recess 13 and hole 15 make it possible to employ a fastening element such as a split pin 16 or like element. The fastening element 16 is so formed as to provide an eye 17 at one side of the lure which is connected with the eye 18 of a fish hook 19, and also provides portions 20 set in the recess 13 in the opposite side of the lure, to prevent said fastening element 16 from turning.

In order to utilize the drag of the water when trolling to hold the hook up in the correct striking position in contact with the lure and to cause said lure and the hook to wabble laterally, there is provided a member 21 in the form of a fin, having a hole 22 at one end which accommodates the eye 17 of the fastening element, and said member 21 also has a slot 23 through which the shank of the hook 19 extends.

In order to limit the downward motion of the hook, and to prevent the hook from locking or cocking, there is provided a member 24 in the form of a disk. The member 24 is so formed as to provide a portion 25 in the plane of the member, with holes or notches 26 at opposite sides of the portion 25. The member 24 thus formed is adapted to be connected with the eye of the fastening element 16 by inserting the portion 25 in the eye 17 contiguous the eye 18 of the hook. The member 24 so positioned will encounter the lure and in that way limit the motion or pivotal movement of the hook 19 with respect to the lure to prevent the hook from locking or cocking.

It is to be understood that the attachments or members 21 and 24 may be used together, or that one or the other may be used alone for the purposes mentioned.

It is to be understood that while the covering of the lure is specified as being of tin, use may be made of other materials or metals which nearly approach silver in whiteness or luster. The core or body 10 of the lure is intended to be of comparatively cheap material which will give to the lure the desired weight, such material as lead for instance, which, however would not have the desired whiteness or luster.

I claim:

1. The combination with a fish lure, of a fish hook, and means connecting the hook with the lure for relative movement, said means extending through the lure and providing an eye at one side of the lure connected with the eye of the hook and having portions set in a recess in the opposite side of the lure to prevent said means from turning.

2. The combination with a fish lure, of a fish hook, means connecting the hook with the lure for lateral and up and down movement with respect thereto, together with means connected with the first mentioned means and engageable with the hook and lure for limiting the movement of the hook to a predetermined degree in a predetermined direction.

3. A trolling device comprising a fish lure, a fish hook, means connecting the hook with the lure in such a manner that the hook may have lateral movement and up and down movement with respect to the lure, and a member carried by the hook acted on by the drag of the water when the device is drawn through the water, adapted to hold the hook up in striking position and to cause the device to wabble laterally.

4. The combination with a fish lure, of a fish hook, and means connecting the hook with the lure for relative movement, said means being so formed as to extend through the lure and to provide an eye at one side of the lure connected with the eye of the hook, and a member connected with the eye first mentioned and engageable with the lure and eye of the hook for the purpose of limiting the movement of the hook to a predetermined position.

Signed at New York, in the county of New York and State of New York this 23rd day of January, A. D. 1928.

CHESTER A. BRAIDWOOD.